(12) United States Patent
Crean

(10) Patent No.: US 6,175,714 B1
(45) Date of Patent: Jan. 16, 2001

(54) DOCUMENT CONTROL SYSTEM AND METHOD FOR DIGITAL COPIERS

(75) Inventor: Peter A. Crean, Penfield, NY (US)

(73) Assignee: Xerox Corporation, Stamford, CT (US)

(*) Notice: Under 35 U.S.C. 154(b), the term of this patent shall be extended for 0 days.

(21) Appl. No.: 09/388,672

(22) Filed: Sep. 2, 1999

(51) Int. Cl.$^7$ .................................................. G03G 21/00
(52) U.S. Cl. ............................................................ 399/366
(58) Field of Search ............................................ 399/366

(56) References Cited

U.S. PATENT DOCUMENTS

| | | | |
|---|---|---|---|
| 5,444,779 | 8/1995 | Daniele | 380/3 |
| 5,604,596 | * 2/1997 | Ukai et al. | 399/366 X |
| 5,640,253 | * 6/1997 | Uchida et al. | 399/366 X |
| 5,740,514 | * 4/1998 | Natsudaira | 399/366 |
| 5,771,101 | 6/1998 | Bramall | 399/366 X |
| 5,822,660 | * 10/1998 | Wen | 399/366 X |
| 5,901,224 | 5/1999 | Hecht | 399/366 X |
| 5,982,956 | * 11/1999 | Lahmi | 399/366 X |
| 5,999,766 | * 12/1999 | Hisatomi et al. | 399/366 |

* cited by examiner

*Primary Examiner*—Fred L. Braun
(74) *Attorney, Agent, or Firm*—Fay, Sharpe, Fagan, Minnich & McKee, LLP

(57) ABSTRACT

A digital image reproducing apparatus, such as a copier, facsimile machine, or a scanner includes a code detector which analyzes a digital representation of an input document, either directly or in memory for visually apparent machine readable code embedded in the background of the document. A decoder operatively connected with the detector analyzes the machine readable code and determines a security code associated with the original document. A control unit compares the security code from the document with a user authorization or security code and, based on the comparison determines whether to allow or disallow the digitized document to be reproduced. If the document is allowed to be reproduced, an image reproducing system, under the control of the control unit, reproduces the document including any image on the document and the low density tinted background containing the machine readable code. As an added security feature, the control unit may also direct portions of the user identification data arid/or the security data associated with the document to be stored in a database for later review by security personnel. Additionally, a processor in communication with the control unit may be provided to modify the security code of the original document to include other data, such as user information, in the reproduced document. Alternately, the processor may also generate new security codes at the direction of a user for incorporation into documents which contain no original security code, or whose original security code should be changed.

17 Claims, 2 Drawing Sheets

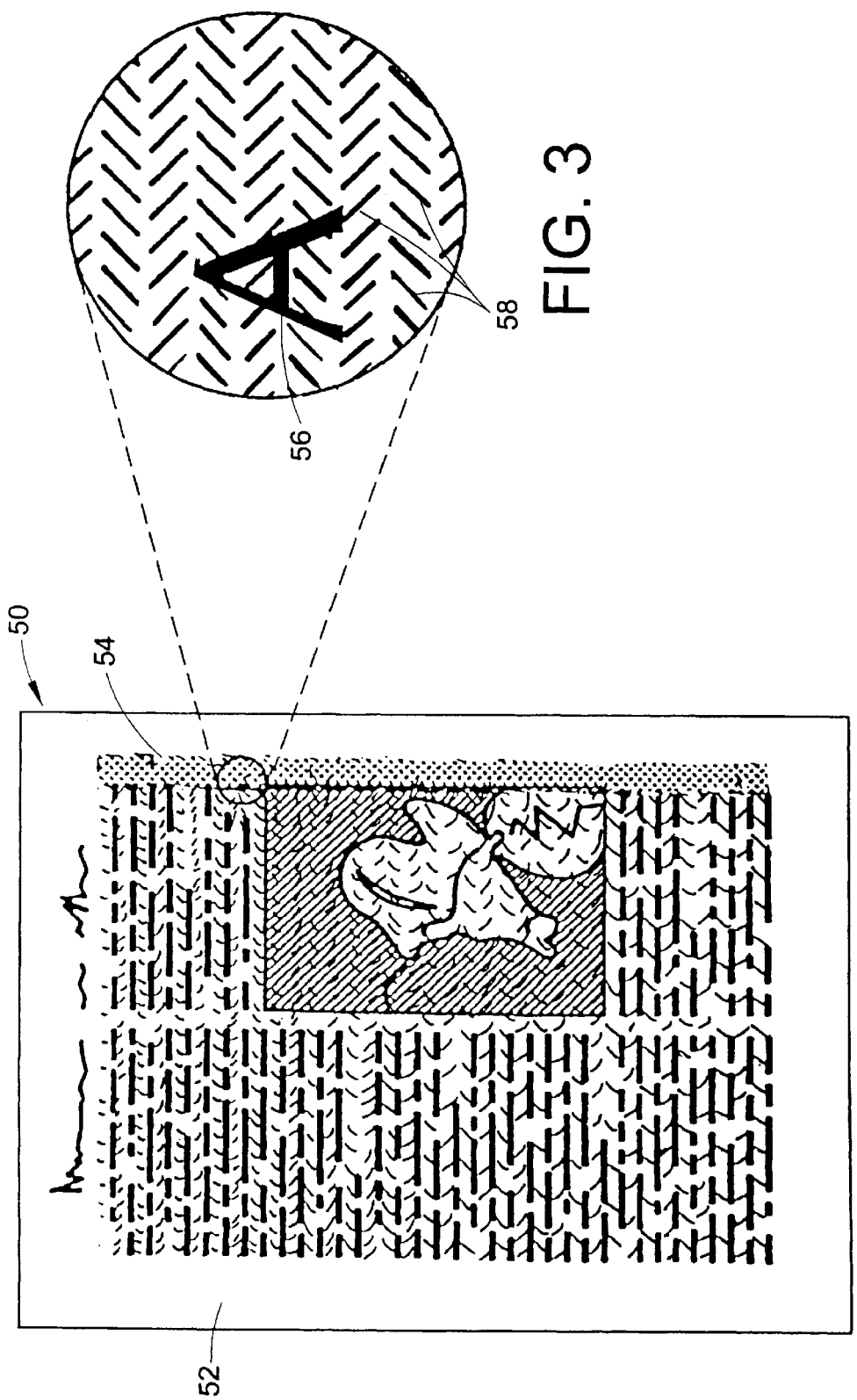

DOCUMENT CONTROL SYSTEM AND METHOD FOR DIGITAL COPIERS

BACKGROUND OF THE INVENTION

The present invention relates to the controlled copying of a source document on reprographic devices according to an authorization or security scheme identifying the source document and operator.

Control of document duplication is a concern for both government and industry. Security sensitive documents range from classified military materials to the trade secrets of any company. Regardless of the organization, such offices typically contain photocopy machines. As such, there is a risk of sensitive documents being reproduced innocently or illicitly by persons without authorization. Unfortunately, removing the copiers or seriously restricting their use impedes basic flow of business activities within the organization for the sake of a few sensitive documents.

Methods exist to limit the usefulness of unauthorized copies. Various methods of changing or modifying the paper or substrate on which sensitive information is printed have been tried. For example, checks and banking documents are typically printed on special paper which, when copied, alter their appearance to destroy information contained thereon or to indicate that the document at hand is a copy. Other attempts to create copy-proof documents use special paper with fluorescent dyes or polka dot paper written upon in colored ink. Such documents are hard to read in the original, and can easily be defeated with modern panchromatic copiers and appropriate colored plastic sheets.

Other security systems, such as that described in U.S. Pat. No. 5,771,101 to Bramall, include a high capacity memory for storing images of all copies made along with user identification information. At a later time, the high capacity storage device is reviewed by security staff. Unfortunately, such systems are best suited to identify persons who have already made unauthorized copies rather than to prevent the copies from being made in the first place.

Bramall also suggests a mechanism to disable a photocopy machine by requiring both a copy card and a personal identification number or the like similar to those used by automated teller machines. This requires user interaction with the reproducing device and fails to account for various classifications of documents. Accordingly, a need exists for a system and method to control reproduction of sensitive documents based on both a security of the document to be copied and the user requesting such reproduction.

The present invention contemplates a new and improved system and method for controlling the reproduction of documents via photocopy machines, fax machines, and other digital acquisition devices which overcomes the above-referenced problems and others.

SUMMARY OF THE INVENTION

In accordance with one aspect of the present invention, the digital image reproducing apparatus includes a code detector having access to a digital representation of an input document. The code detector detects visually apparent machine readable code embedded in the background of the document. A code decoder is also provided operatively connected to the code detector which decodes the previously detected machine readable code into information data including a security code previously associated with the document. A control unit receives a user authorization code and the decoded security code and, based on these two allows or disallows the digitized document to be reproduced. Reproduction can be via photocopy, facsimile-type data for transmission, and/or the storage of the digitized data representing the document following a scanning operation.

In accordance with a more limited aspect of the present invention, the digital image reproducing apparatus also includes a storage or memory for storing data including selected parts of the machine readable code and/or selected parts input user information.

In accordance with a more limited aspect of the present invention, a processor is also provided in communication with the control unit. In certain circumstances, the processor modifies the decoded security code to incorporate additional data including user information. The modified security code is passed to an encoder which converts the security code into visually apparent machine readable code.

In accordance with a more limited aspect of the present invention, the digital image reproducing apparatus includes the capability to place a desired security code configured as visually apparent machine readable code into a document. The apparatus includes a processor in operative communication with the control unit for generating a security code which includes the desired security code. The security code is then passed to an encoder which encodes the security code into appropriate machine readable code.

In accordance with a second aspect of the present invention, a code detector in a digital image reproducing apparatus detects visually apparent, machine readable code in a digitized image, if the code is present. If the code is detected, a code decoder derives a security code associated with the document. A control unit receives the code and determines whether to reproduce the digitized document based on the security code associated with the document and an authorization code associated with a user.

In accordance with a more limited aspect of the present invention, the code detector is in operative communication with an image digitizer, and receives the machine readable code therefrom.

In accordance with another more limited aspect of the present invention, the machine readable code from the digitizer is deposited into a memory which is accessible by the detector.

In accordance with a more limited aspect of the present invention, the visually apparent machine readable code includes at least one selected from the list of glyphs, bar codes and/or microdots.

In accordance with yet another aspect of the present invention, a method of controlling reproduction of a document includes determining a user's authorization code. Visually apparent machine readable code contained in the background of the digitized document is detected and decoded to derive a security code associated with the document. The security code associated with the document is compared with an authorization code for the user and if the comparison meets certain criteria, reproduction of the document is disallowed.

In accordance with a more limited aspect of the present invention, identification data for the user and/or the document is stored upon an attempt to reproduce the document.

In accordance with a more limited aspect of the present invention, the security code is modified to include user identification data which is then included on the reproduced document.

One advantage of the present invention resides in the visually apparent background whose patterns, indicating the presence of a security system, may alone limit the number of unauthorized reproductions.

Another advantage of the present invention resides in the presence of a low density background across the entire page to prevent the security code from being inadvertently or intentionally defeated.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 2 is an exemplary illustration of a document containing machine readable code in accordance with the present invention; and, FIG. 3 is a magnified view of a portion of FIG. 2.

DETAILED DESCRIPTION OF THE PREFERRED EMBODIMENTS

Figure 1:
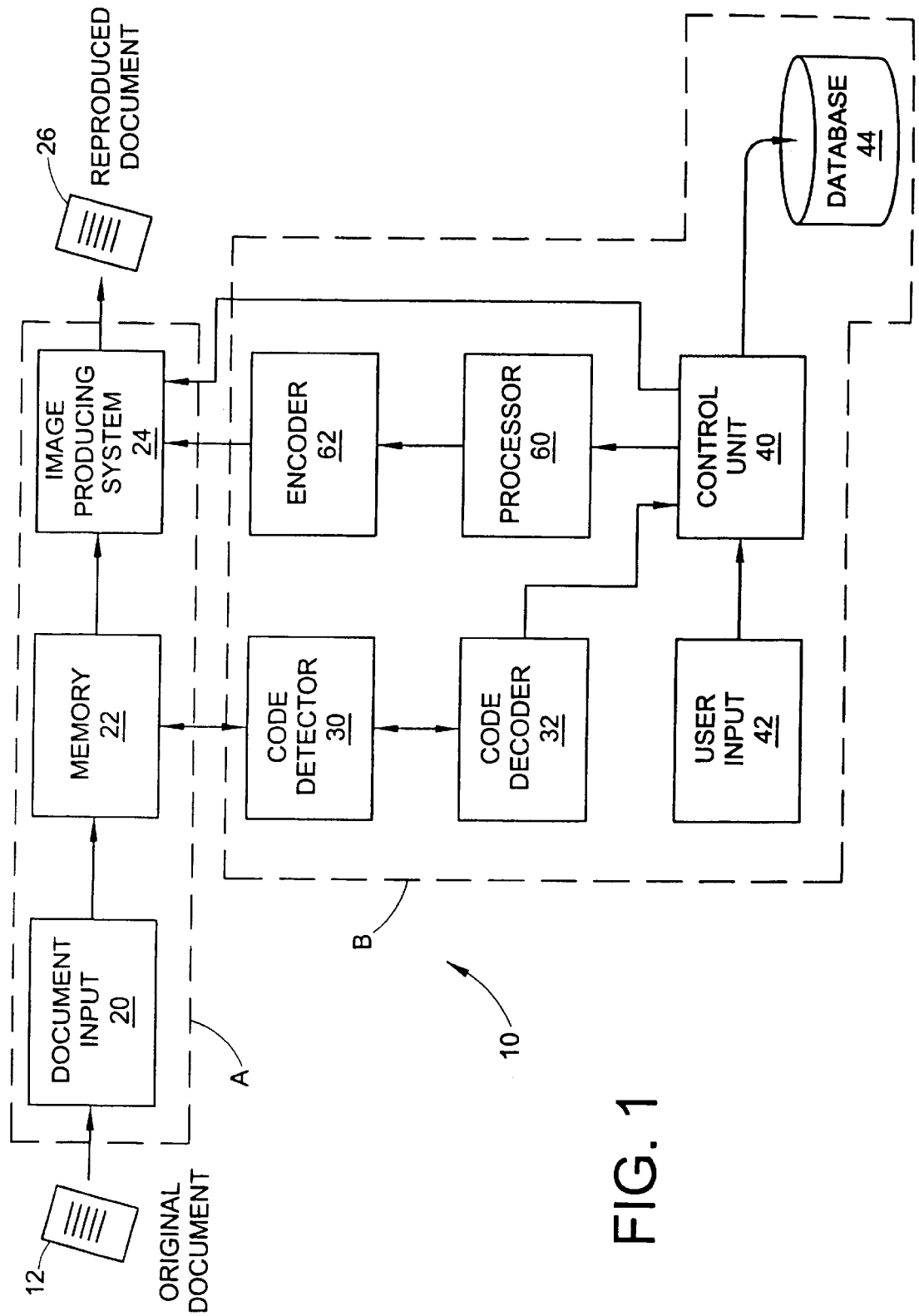
FIG. 1 is a diagrammatic illustration of a system in accordance with the present invention.

With reference to FIG. 1, a digital image reproducing device 10 includes components A known to those skilled in the art for document acquisition, storage, and reproduction. The components A can be configured as copiers, scanners, facsimile machines, and the like. The digital image reproducing device 10 also includes components B to control the reproduction of specially encoded documents as will be discussed more fully below.

Components A include a document input and digitizer 20 which receives and digitizes the original document 12 for storage in memory 22. With conventional systems, the digital image representation contained in the memory 22 would then be reproduced by an image reproducing system 24 into a reproduced document 26 or representation thereof. It is appreciated by those skilled in the art that the reproduced document 26 may be either a stored digital image in the case of a scanner, a data stream compliant with facsimile protocol in the case of a facsimile, or a hard copy output in the case of a copier.

The components B include a code detector 30 preferably in communication with the memory 22 for detecting machine readable code contained in the document 12 as the digital representation thereof is deposited into memory 22. Alternately, the digitized representation of the document 12 could be fed simultaneously to both memory 22 and to code detector 30 with no loss of functionality.

Once machine readable code is detected, code detector 30 provides the detected machine readable code to a decoder 32 which derives from the machine readable code a security code associated with the original document 12. Alternately, code detector 30 could provide a pointer to the decoder 32 which indicates the memory location or locations of the machine readable code in memory 22. Upon determination of the security code, the decoder 32 communicates the security code to control unit 40.

With reference now to FIG. 2, a document 50 including an image 52 over a background 54 is shown. As further illustrated by the enlarged document sections of FIG. 3, the image 52 comprises text 56 over a background of human visible, machine readable code configured as glyphs 58. The coding and decoding of glyphs is well-known in the art and is described in commonly assigned U.S. Pat. No. 5,444,779. The use of glyph technology to lay down a low-density background tint across the entire page is a preferred implementation because it does not alter the legibility of the document, and will be reproduced in any authorized or unauthorized duplication. Moreover, a glyph background tint across the entire page is not susceptible to intentional or inadvertent masking, thus ensuring the security code will be detected on equipped devices and reproduced on any reproducing apparatus. As an added measure or level of security, the low density background tint is observable on the original document. Thus, persons will be dissuaded from attempting to reproduce the document knowing it contains embedded security information. Alternatively, the reproduction device could be programmed to only accept documents where the code is found in a specific place. Those skilled in the art will realize that other types of machine readable codes may alternately be embedded in the document for detection and analysis by components B, such as microdots, bar codes and the like, without departing from the spirit and scope of the present invention.

Referring back to FIG. 1, control unit 40 also receives data or information from user input 42 in addition to the decoded security code. Preferably, the control unit determines from the input user data a user authorization code. The user input 42 can comprise a card scanner, auditron pass, finger print recognition, voice recognition, retinal scan or others of the personal identification systems familiar to those skilled in the security arts. The control unit 40 then compares the security code associated with the document against the user's authorization code or clearance. The control unit 40 then controls the image reproducing system 24 to reproduce the original document 12 if the user's authorization code or clearance is determined to permit reproduction of the document based on the comparison of the code in the document and the user's code.

Additionally, control unit 40 interfaces with a database 44 to record the activities of any particular user or operator, and/or documents having a determined security code. For example, an organization may desire records of all users attempting to copy documents for which they do not hold clearance, or an organization may desire records of all copies made of secret documents by all users.

In another embodiment, the digital image reproducing device 10 may be used to place original security codes on documents not previously containing them, or change the existing security code in a document. In either event, the control unit 40 recognizes data from user input 42 containing the new desired security code for the document. The control unit 40 passes the new or modified security code to processor 60 which generates a new code containing the user supplied information. Processor 60 forwards the new security code to an encoder 62 which converts the security code into appropriate machine readable cc-de to be placed in the background of the reproduced document 26. The encoder 62 supplies the new machine readable code to the image reproduction system 24 for incorporation into the reproduced document 26.

Beyond changing the security codes embedded in documents, the system can also modify or create codes to include encoded user information in reproduced documents. In this embodiment the control unit 40 provides certain user information to processor 60. Processor 60 formats the new security code and forwards it to the encoder 62 to be encoded as machine readable code. Similarly, during reproduction the encoder 62 supplies the encoded security code to the image producing system 24 for incorporation into the reproduced document 26.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof

Having thus described the preferred embodiments, the invention is now claimed to be:

1. A digital image reproducing apparatus comprising:
    an input that receives and digitizes a document comprising an image and a background comprising visually apparent machine readable code;
    a storage device in operative communication with the input, which stores the digitized document;
    a code detector having access to the digitized document, which detects the machine readable code in the background;
    a code decoder in operative communication with the code detector, which decodes a security code from the detected machine readable code;
    a user input device to receive user information including a user authorization code; and,
    a control unit in communication with the user input device which (i) receives the user authorization code, (ii) compares the user authorization code with the decoded security code, and based on the comparison (iii) allows or disallows the digitized document to be reproduced.

2. The digital image reproducing apparatus as set forth in claim 1, further comprising:
    an image producing system controlled by the control unit, which reproduces the document comprising the image and the background.

3. The digital image reproducing apparatus as set forth in claim 2, further comprising a second storage which stores data including:
    selected parts of the machine readable code; and,
    selected parts of the user information.

4. The digital image reproducing apparatus as set forth in claim 1, further including:
    a processor in operative communication with the control unit, which modifies the security code to incorporate data including user information; and,
    an encoder in operative communication with the processor, which encodes the modified security code into modified machine readable code.

5. The digital image reproducing apparatus as set forth in claim 4, further comprising:
    an image producing, system controlled by the control unit, which reproduces the document comprising the image and a background including the modified machine readable code.

6. A digital image reproducing apparatus comprising:
    an input that receives and digitizes a document;
    a user input device to receive user information including a desired security code to be associated with the document;
    a processor in operative communication with the user input device, which generates a security code including the desired security code; and,
    an encoder in operative communication with the processor, which encodes the security code into machine readable code.

7. In a digital image reproducing apparatus having a digitizer for creating a digital representation of an input image, a user input device for receiving a user authorization code, and an output for reproducing the image; the apparatus comprising:
    a code detector in operative communication with the digitizer, which detects visually apparent machine readable code in the digitized image, if said code is present;
    a code decoder in communication with the code detector, which determines a security code from the detected machine readable code; and,
    a control unit which, based on the user authorization code and the security code, determines whether to reproduce the digitized document.

8. The digital image reproducing apparatus as set forth in claim 7, further comprising:
    a memory in data communication with the digitizer for storing the digitized image wherein the detector accesses the memory to detect the machine readable code.

9. The digital image reproducing apparatus as set forth in claim 7, further comprising in communication with the control unit:
    a storage unit which stores associations of image data and user information to identify a user attempting to reproduce the image.

10. The digital image reproducing apparatus as set forth in claim 7, further comprising:
    a processor in operative communication with the control unit, which modifies the security code to incorporate data including user identification; and,
    an encoder in operative communication with the processor, which encodes the modified security code into modified machine readable code.

11. The digital image reproducing apparatus as set forth in claim 7, wherein a user additionally provides a desired security code to be associated with the document, the apparatus further comprising:
    a processor in operative communication with the control unit, which generates a security code including the desired security code; and,
    an encoder in operative communication with the processor, which encodes the generated security code into modified machine readable code.

12. The digital image reproducing apparatus as set forth in claim 7, wherein the visually apparent machine readable code comprises at least one selected from the set of glyphs, barcodes and microclots.

13. A method of controlling reproduction of a document comprising:
    determining an authorization code for a user;
    digitizing a document,
    storing the digitized document;
    detecting visually apparent machine readable code contained in the background of the digitized document;
    decoding the machine readable code to determine a security code associated with the document;
    comparing the security code associated with the document and the authorization code for the user; and,
    if the security code associated with the document exceeds the authorization code for the user, disallowing reproduction of the document.

14. The method of controlling reproduction of a document as set forth in claim 13, further comprising storing identification data for the user.

15. The method of controlling reproduction of a document as set forth in claim 13, further comprising storing identification data for the document.

16. The method of controlling reproduction of a document as set forth in claim 13, further comprising:
   modifying the security code to include identification data for the user; and,
   reproducing the document including the modified security code.

17. The method of controlling reproduction of a document as set forth in claim 13, further comprising:
   generating a security code;
   encoding the security code into visually apparent machine readable code; and,
   reproducing the document including the machine readable security code.

* * * * *